(12) United States Patent
Togawa

(10) Patent No.: US 8,674,821 B2
(45) Date of Patent: Mar. 18, 2014

(54) TIRE PRESSURE MONITORING APPARATUS

(75) Inventor: Hideshi Togawa, Obu (JP)

(73) Assignee: Denso Corporation, Kariya (JP)

( * ) Notice: Subject to any disclaimer, the term of this patent is extended or adjusted under 35 U.S.C. 154(b) by 314 days.

(21) Appl. No.: 13/337,578

(22) Filed: Dec. 27, 2011

(65) Prior Publication Data

US 2012/0161955 A1 Jun. 28, 2012

(30) Foreign Application Priority Data

Dec. 28, 2010 (JP) ................................ 2010-293332

(51) Int. Cl.
*B60C 23/02* (2006.01)
*B60C 23/00* (2006.01)

(52) U.S. Cl.
USPC .......... 340/442; 340/447; 73/146.4; 73/146.5

(58) Field of Classification Search
USPC ............ 340/442, 444–449, 427, 438; 73/146, 73/146.2, 146.3, 146.4, 146.5; 116/34 R, 116/34 B; 152/152.1, 415
See application file for complete search history.

(56) References Cited

U.S. PATENT DOCUMENTS

| 6,259,360 | B1 * | 7/2001 | Takamura ..................... 340/445 |
| 7,330,104 | B2 * | 2/2008 | Tsukamoto et al. .......... 340/442 |
| 8,299,908 | B2 * | 10/2012 | Isomura et al. ............... 340/442 |
| 2007/0008097 | A1 | 1/2007 | Mori et al. |
| 2007/0171038 | A1 | 7/2007 | Maekawa |
| 2007/0220965 | A1 | 9/2007 | Walraet |
| 2011/0148617 | A1 | 6/2011 | Kusunoki et al. |

FOREIGN PATENT DOCUMENTS

| JP | 2003-267011 | 9/2003 |
| JP | 2005-280369 | 10/2005 |
| JP | 2007-015491 | 1/2007 |
| JP | A-2008-207637 | 9/2008 |
| JP | A-2009-51347 | 3/2009 |
| WO | WO 2010/122610 | 10/2010 |

OTHER PUBLICATIONS

Office action dated May 21, 2013 in corresponding Japanese Application No. 2010-293332.
Office Action mailed Sep. 25, 2012 in corresponding Japanese Application No. 2010-293332 with English translation.

* cited by examiner

*Primary Examiner* — Anh V La
(74) *Attorney, Agent, or Firm* — Harness, Dickey & Pierce, PLC

(57) ABSTRACT

A tire pressure monitoring apparatus includes a plurality of transceivers, a receiver and a warning device. Each transceiver is mounted on a respective wheel having a tire in a vehicle. The receiver is mounted on a body of the vehicle. The warning device receives a warning signal transmitted from the receiver. Each transceiver includes a sensing unit, a first control unit and a transmitting unit. The receiver includes a receiving unit and a second control unit. Each transceiver or the receiver includes a determination unit, which determines whether the tire pressure increases while the vehicle is parked. When the determination unit determines that the tire pressure is increased while the vehicle is parked, the second control unit calculates the selected threshold value, and stores the selected threshold value.

4 Claims, 3 Drawing Sheets

TIRE PRESSURE MONITORING APPARATUS

CROSS REFERENCE TO RELATED APPLICATIONS

This application is based on Japanese Patent Application No. 2010-293332 filed on Dec. 28, 2010, the disclosure of which is incorporated herein by reference.

TECHNICAL FIELD

The present disclosure relates to a tire pressure monitoring apparatus.

BACKGROUND

As a tire pressure monitoring apparatus, a direct type apparatus is widely known (for example, see JP 4175348). The direct type tire pressure monitoring apparatus has multiple transmitters, an antenna and a receiver. Each of the transmitters is directly mounted on a corresponding wheel of a vehicle. Each of the transmitters is equipped with a sensor, such as a pressure sensor. The antenna and the receiver are mounted on a body of the vehicle. When a detection signal is detected by the sensor, the detection signal is transmitted from the transmitter and is received by the receiver via the antenna. Thus, a tire pressure is detected. When the detected tire pressure is lower than an alarm threshold value, the alarm is activated.

The direct type of the tire pressure monitoring apparatus that is operated by a user and has an initialization switch (reset switch) is currently mounted on a vehicle for practical use. The initialization switch is used for initializing the alarm threshold value, and is mounted inside of the vehicle. The initialization switch is coupled with the receiver by a wiring.

In the above-described tire pressure monitoring apparatus, when an adjusted tire pressure is different from a recommended tire pressure, the alarm threshold value is settable according to the regulated tire pressure. For example, when the tire pressure is regulated to be higher than the recommended tire pressure to meet a preference of a user, the alarm threshold value is set according to the regulated tire pressure.

However, in the tire pressure monitoring apparatus equipped with the initialization switch, operation of the initialization switch is necessary for the user in order to initialize a selected threshold value, which can be set to any value. Therefore, the user may feel inconvenienced.

Further, in the tire pressure monitoring apparatus equipped with the initialization switch, the initialization switch and the wiring, which couples the initialization switch to the receiver, need to be mounted for each vehicle. Accordingly, the number of components of the tire pressure monitoring apparatus is increased, and mounting of the tire pressure monitoring apparatus to the vehicle is laborious.

SUMMARY

In view of the foregoing difficulties, it is an object of the present disclosure to provide a tire pressure monitoring apparatus in which inconvenience of initialization is resolved, and an initialization switch and a wiring that couples the initialization switch to a receiver are not required to be mounted on a vehicle.

According to a first aspect of the present disclosure, a tire pressure monitoring apparatus includes a plurality of transceivers, a receiver and a warning device. Each transceiver is mounted on a respective wheel having a tire in a vehicle. The receiver is mounted on a body of the vehicle. The warning device receives a warning signal transmitted from the receiver. Each transceiver includes a sensing unit, a first control unit and a transmitting unit. The sensing unit outputs the tire pressure signal, the first control unit processes the tire pressure signal outputted by the sensing unit to a processed tire pressure signal, and the transmitting unit transmits the processed tire pressure signal to the receiver. The receiver includes a receiving unit and a second control unit. The receiving unit receives the processed tire pressure signal, the second control unit calculates a tire pressure according to the processed tire pressure signal and activates the warning device when the tire pressure is lower than an alarm threshold value. The second control unit sets a selected threshold value as the alarm threshold value, and the selected threshold value is initially set by a user. Each transceiver or the receiver includes a determination unit, which determines whether the tire pressure increases while the vehicle is parked. When the determination unit determines that a current tire pressure is increased compared with a previous tire pressure while the vehicle is parked, the second control unit calculates the selected threshold value according to the current tire pressure, and stores the selected threshold value.

In the above apparatus, inconvenience of initialization for the user is resolved compared with a tire pressure monitoring apparatus that needs an operation for initialization, and an initialization switch and a wiring that couples the initialization switch to the receiver are not required to be mounted on the vehicle.

According to a second aspect of the present disclosure, a tire pressure monitoring apparatus includes a plurality of transceivers, a receiver and a warning device. Each transceiver is mounted on a respective wheel having a tire in a vehicle. The receiver is mounted on a body of the vehicle. The warning device receives a warning signal transmitted from the receiver. Each transceiver includes a sensing unit, a first control unit and a transmitting unit. The sensing unit outputs the tire pressure signal, the first control unit processes the tire pressure signal outputted by the sensing unit to a processed tire pressure signal, and the transmitting unit transmits the processed tire pressure signal to the receiver. The receiver includes a receiving unit and a second control unit. The receiving unit receives the processed tire pressure signal, the second control unit calculates a tire pressure according to the processed tire pressure signal and activates the warning device when the tire pressure is lower than an alarm threshold value. The second control unit sets a selected threshold value as the alarm threshold value, and the selected threshold value is initially set by a user. Each transceiver or the receiver includes a calculation unit and a determination unit, the calculation unit calculates a tire pressure increase rate based on a previous tire pressure and a current tire pressure, and the determination unit determines whether the tire pressure increases rate is equal to or higher than a predetermined rate value. When the determination unit determines that the tire pressure increase rate is equal to or higher than the predetermined rate value, the second control unit calculates the selected threshold value according to the current tire pressure, and stores the selected threshold value.

In the above apparatus, inconvenience of initialization for the user is resolved compared with a tire pressure monitoring apparatus that needs an operation for initialization, and an initialization switch and a wiring that couples the initialization switch to the receiver are not required to be mounted on the vehicle.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION (First Embodiment)

Figure 1:
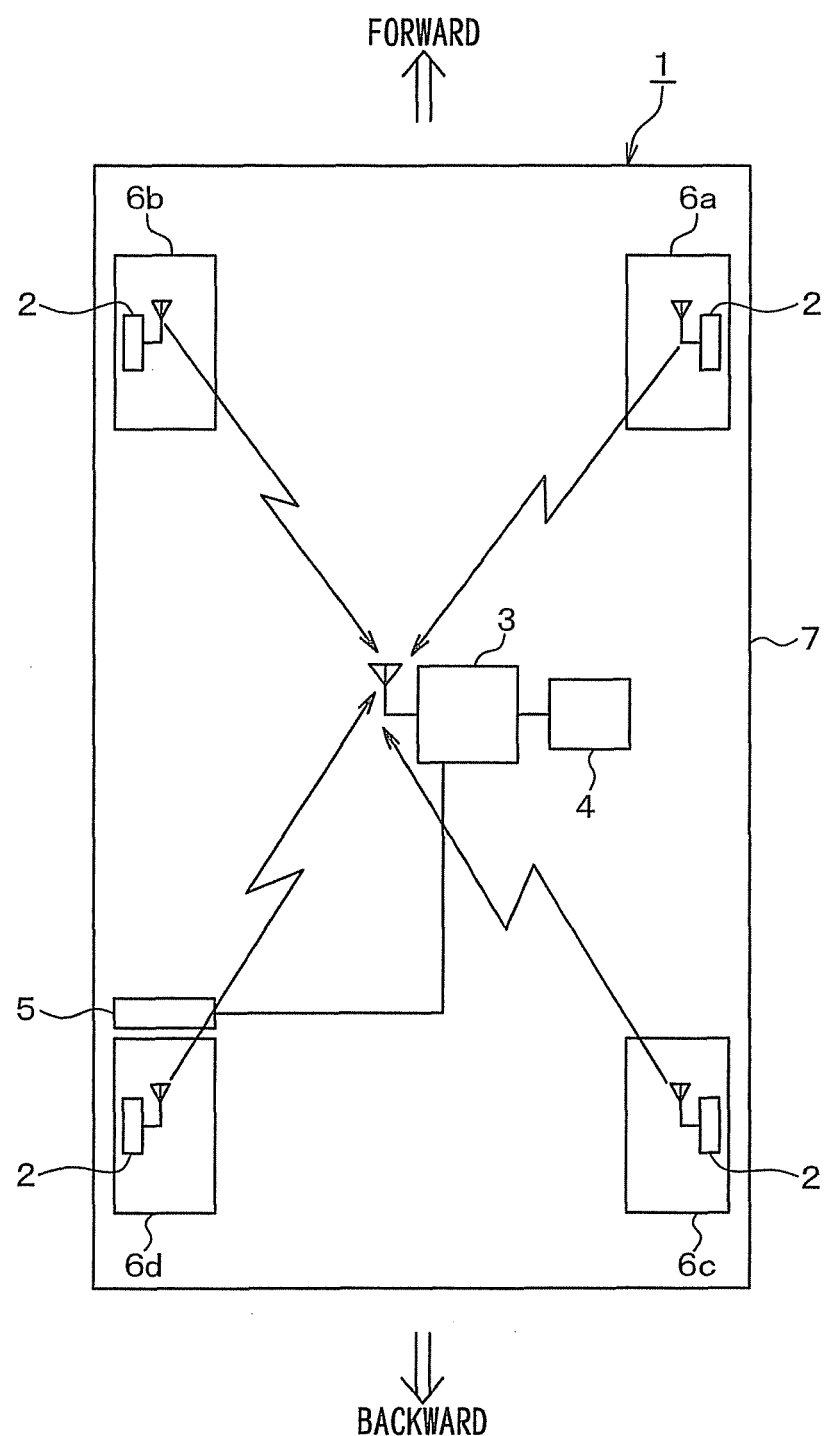
FIG. 1 is a block diagram showing an overall configuration of a tire pressure monitoring apparatus according to a first embodiment.

A first embodiment of the present disclosure will be described with reference to FIG. 1 to FIG. 3. In FIG. 1, an upper direction along a surface of a sheet corresponds to a forward direction of a vehicle, and a lower direction along the surface of the sheet corresponds to a backward direction of the vehicle.

As shown in FIG. 1, a tire pressure monitoring apparatus is mounted on a vehicle 1, and includes four transceivers 2, a receiver 3, a display device 4 and a trigger device 5.

Figure 2A:
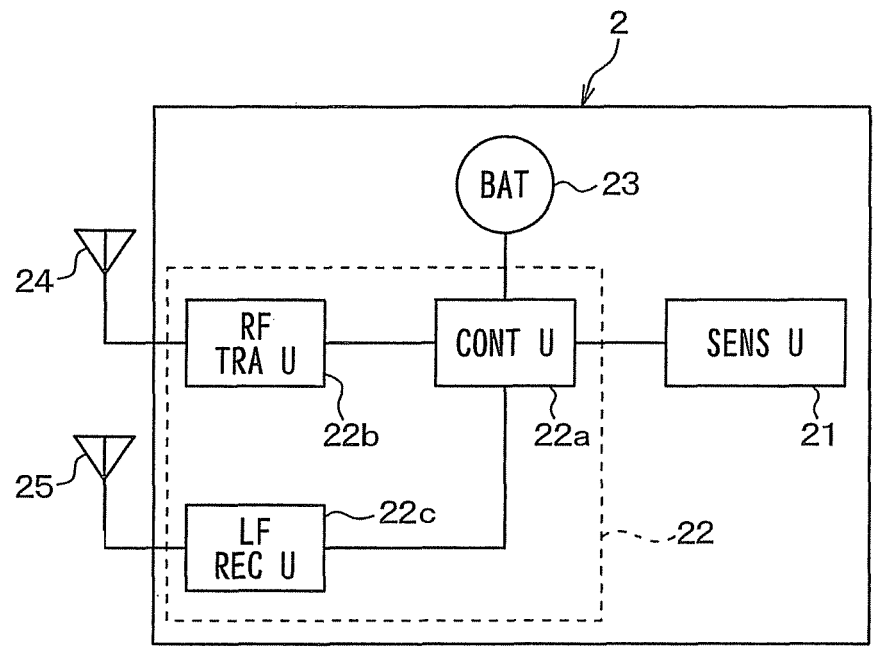
FIGS. 2A and 2B are block diagrams respectively showing a transceiver and a receiver of the tire pressure monitoring apparatus shown in FIG. 1.
Figure 2B:
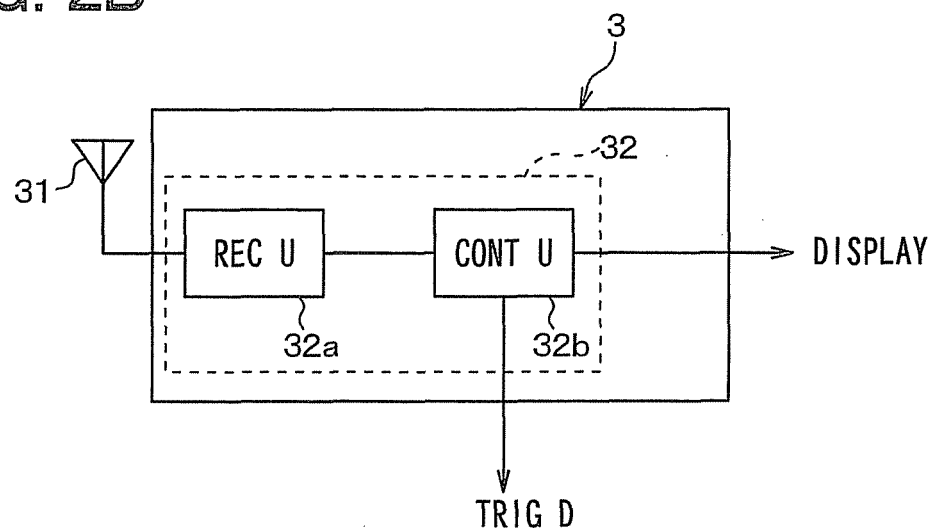

As shown in FIG. 1, each transceiver 2 is respectively mounted on a respective wheel 6a to 6d of the vehicle 1, and detects a tire pressure of a tire fitted on a corresponding wheel 6a to 6d. Each transceiver 2 stores detection signal information indicative of a detection result of the tire pressure in a frame, and transmits the detection signal information. The receiver 3 is mounted on a body 7 of the vehicle 1. The receiver 3 receives the transmission frame transmitted from each transceiver 2, and obtains the tire pressure by processing the detection signal information stored in the transmission frame. FIG. 2A and FIG. 2B respectively show configurations of the transceiver 2 and the receiver 3.

As shown in FIG. 2A, each transceiver 2 includes a sensing unit 21, a microcomputer 22, a battery 23, a transmitting antenna 24 and a receiving antenna 25.

The sensing unit 21 includes, for example, a diaphragm-type pressure sensor and a temperature sensor. The diaphragm-type pressure sensor detects a tire pressure, and outputs a tire pressure detection signal corresponding to the tire pressure. The temperature sensor detects a tire temperature in a tire, and outputs a tire temperature detection signal corresponding to the tire temperature. The tire temperature means a temperature in the tire. Additionally, the sensing unit 21 includes an acceleration sensor, which detects an acceleration and outputs an acceleration detection signal corresponding to the acceleration (centrifugal force) generated by a rotation of the wheel.

The microcomputer 22 is a well-known type microcomputer and includes a control unit (a first control unit) 22a, a radio frequency (RF) transmitting unit 22b and a low frequency (LF) receiving unit 22c. The microcomputer 22 executes a predetermined process according to a program stored in a memory (not shown) of the control unit 22a.

The control unit 22a receives the tire pressure detection signal, the tire temperature detection signal and the acceleration detection signal, which are transmitted from the sensing unit 21. The control unit 22a processes the tire pressure detection signal to obtain tire pressure information indicative of the detected tire pressure of the corresponding tire. Similarly, the control unit 22a processes the tire temperature detection signal and the acceleration detection signal to respectively obtain tire temperature information indicative of the detected tire temperature in the corresponding tire and acceleration information indicative of the detected acceleration. Then, the control unit 22a generates and transmits a frame to the RF transmitting unit 22b. The frame includes the tire pressure information, the tire temperature information, the acceleration information and identification (ID) information. The ID information is indicative of the identification of each transceiver 2. The control unit 22a transmits the tire pressure information, the tire temperature information, the acceleration information and the ID information at predetermined time intervals according to the program.

Further, the control unit 22a receives a trigger signal from the trigger device 5 via the receiving antenna 25 and the LF receiving unit 22c. The control unit 22a processes the trigger signal to obtain signal strength information indicative of signal strength of the received trigger signal. The control unit 22a transmits the signal strength information to the RF transmitting unit 22b with other information together stored in the same frame, or transmits to the RF transmitting unit 22b stored in another frame. The control unit 22a transmits the signal strength information at predetermined time intervals according to the program.

In each transceiver 2, a predetermined transmit time of the frame is differently set from each other. The transmit time of the frame is a predetermined seconds later than a receipt time of the trigger signal. Therefore, the transceivers 2 mounted on the wheels 6a to 6d transmit the frames at different times from one another.

The RF transmitting unit 22b transmits the frame, which is transmitted from the control unit 22a, to the receiver 3 via the transmitting antenna 24 at a predetermined frequency, such as 315 MHz, in the RF band. The RF transmitting unit 22b functions as an outputting unit.

The LF receiving unit 22c receives the trigger signal, which is transmitted from the trigger device 5, via the receiving antenna 25 at a predetermined frequency, such as 125 kHz, in the LF band, and transmits the trigger signal to the control unit 22a. The LF receiving unit 22c functions as an inputting unit.

The battery 23 supplies electric power to the control unit 22a, the sensing unit 21 and the like. Specifically, when the electric power is supplied by the battery 23, the control unit 22a executes various processes and the sensing unit 21 detects various detection signals regarding the tire pressure.

The transceiver 2 having above-described configuration, may be mounted on, for example, an air bulb disposed on each of the wheels 6a to 6d. The sensing unit 21 may be mounted on an inner side of each of the tires and exposed on an inner surface of the corresponding tire. Thus, the tire pressure of the corresponding tire is detected, and the transceiver 2 transmits the frame via the transmitting antenna 24 at predetermined time intervals (for example, at every one minute).

As shown in FIG. 2B, the receiver 3 includes a receiving antenna 31 and a microcomputer 32.

The receiving antenna 31 receives panoptically the frames transmitted from the transceivers 2. The receiver 3 may have a common receiving antenna 31, or may have two common receiving antennas 31. The receiving antenna 31 is mounted on the body 7 of the vehicle 1.

The microcomputer 32 is a well-known type microcomputer and includes a receiving unit 32a and a control unit (a second control unit) 32b. The microcomputer 32 executes a predetermined process according to a program stored in a memory (not shown) of the control unit 32b.

The receiving unit 32a transmits the frames, which are transmitted from the transceivers 2 and received by the receiving antenna 31, to the control unit 32b. The receiving unit 32a functions as an inputting unit.

The control unit 32b outputs a trigger command signal to the trigger device 5, the trigger command signal provides a command to the trigger device 5 to transmit the trigger signal. The control unit 32b receives the frames transmitted from the receiving unit 32a. Each of the frames includes the signal strength information of the trigger signal received by the corresponding transceiver 2. The control unit 32b identifies the wheels 6a to 6d based on the signal strength information of the trigger signal of each transceiver 2, which is stored in the frame.

The control unit 32b obtains the tire pressure of each of the tires by processing and calculating the information included in the corresponding frame transmitted by the receiving unit 32a. Then the control unit 32b compares the obtained tire pressure of each of the tires with an alarm threshold value. When the obtained tire pressure is lower than the alarm threshold value, a warning signal is transmitted to the display device 4. Thus, the display device 4 informs a user of reduction in the tire pressure and the corresponding tire position among the four tires, which are fitted on the wheels 6a to 6d.

In the present embodiment, the alarm threshold value may be set to a selected threshold value or a standard threshold value. The selected threshold value may be set to any value to meet a preference of the user. The standard threshold value is set preliminarily as a fixed value by a manufacturer of the apparatus. The selected threshold value is set based on the tire pressures, which are obtained by processing the information transmitted from each transceiver 2, under a condition that the initialization conditions (steps S11 to S14) are met. Specifically, the selected threshold value is set by calculating a reference tire pressure to a value that is lower than the reference tire pressure by a predetermined percentage, such as 20% to 25%. Then the selected threshold value is stored in the memory (not shown) of the control unit 32b. As described above, initialization process of the selected threshold value is performed. The reference tire pressure may be a common reference tire pressure based on an average tire pressure of the four tires. Alternatively, the reference tire pressure may also be a respective reference tire pressure based on each of the tire pressure. The obtained tire pressure is compared with the selected threshold value and the standard threshold value, and the warning signal is transmitted to the display device 4 when the obtained tire pressure is lower than the selected threshold value or the standard threshold value.

The display device 4 functions as a warning device. When the tire pressure decreases, the display device warns the user the reduction in the tire pressure. As shown in FIG. 1, the warning device is disposed at a place visible for the user. For example, the display device 4 may be a warning lamp on the instrument panel of the vehicle 1. The display device displays the reduction of the tire pressure when the warning signal is transmitted from the control unit 32b of the receiver 3.

The trigger device 5 transmits the trigger signal with a predetermined strength when the trigger device 5 receives the trigger command signal from the control unit 32b of the receiver 3. The trigger device 5 is arranged on the body 7 of the vehicle 1 at a place where four distances between the trigger device 5 and the wheels 6a to 6d are different. In the present embodiment, the trigger device 5 is arranged near the back left wheel 6d. Therefore, the distance between the back left wheel 6d and the trigger device 5, the distance between the back right wheel 6c and the trigger device 5, the distance between the front left wheel 6b and the trigger device 5, and the distance between the front right wheel 6a and the trigger device 5 increase in this order.

The tire pressure monitoring apparatus according to the present embodiment is configured as described above. An operation of the tire pressure monitoring apparatus will be described.

First, when an ignition switch (not shown) switches from an off state to an on state, wheel identification process starts. That is, when electric power is supplied to the control unit 32b of the receiver 3 and after a predetermined time elapses, the control unit 32b of the receiver 3 transmits the trigger command signal to the trigger device 5 for identifying one of the wheels. When the trigger device 5 receives the trigger command signal, the trigger device 5 transmits the trigger signal with the predetermined strength to each transceiver 2.

When the trigger signal is received by the receiving antenna 25 and the LF receiving unit 22c of each transceiver 2, and is input to the control unit 22a, the control unit 22a turns to a wake-up state and determines the strength of the trigger signal. After each transceiver 2 determines the strength of the trigger signal, each transceiver 2 stores the signal strength information and the ID information of each transceiver 2 together in a frame, and then transmits the frame to the receiver 3.

When the receiver 3 receives the frame transmitted from each transceiver 2, the control unit 32b retrieves the signal strength information and the ID information contained in the frames. Then, the control unit 32b sorts the frames in the descending order of the signal strengths of the trigger signals.

It is known that the signal strength decays with a distance from the trigger device 5 to the transceiver 2. The distance from the trigger device 5 to each transceiver 2 increases in the order of the back left wheel 6d, the back right wheel 6c, the front left wheel 6b, and the front right wheel 6a. Therefore, the signal strength of each of the trigger signal decreases in the order of the back left wheel 6d, the back right wheel 6c, the front left wheel 6b, and the front right wheel 6a.

Accordingly, the control unit 32b identifies the frame transmitted from the transceiver 2 mounted on the back left wheel 6d as a frame having a maximum signal strength. The control unit 32b identifies the frame transmitted from the transceiver 2 mounted on the back right wheel 6c as a frame having a second signal strength. The control unit 32b identifies the frame transmitted from the transceiver 2 mounted on the front left wheel 6b as a frame having a third signal strength. The control unit 32b identifies the frame transmitted from the transceiver 2 mounted on the front right wheel 6a as a frame having a minimum signal strength. Then the control unit 32b stores the ID information of the transceivers 2 in the memory of the control unit 32b in such a manner that the ID information of each transceiver 2 is stored in association with a corresponding wheel 6a to 6d of the transceivers 2.

Next, each transceiver 2 turns to a periodical transmitting mode. In a normal tire pressure detection process, as described above, in each transceiver 2, the sensing unit 21 transmits the detections signals, which include the tire pressure detection signal, the tire temperature detection signal and the acceleration detection signal, to the control unit 22a of each transceiver 2. If necessary, the detection signals may be processed by the control unit 22a of each transceiver 2 so that the tire pressure information, the tire temperature information and the acceleration information are obtained. The control unit 22a of each transceiver 2 stores the tire pressure information, the tire temperature information, the acceleration information and the ID information of each transceiver 2 in the frame, and transmits the frame to the receiver 3 via the RF transmitting unit 22b and the transmitting antenna 24.

After the frame is transmitted from each transceiver 2, the frame is received by the receiver 3 via the receiving antenna and then is input to the control unit 32b via the receiving unit 32a. The tire pressure information, the tire temperature information and the acceleration information contained in the frame are retrieved by the control unit 32b. The control unit 32b calculates the tire pressure of each of the tires by compensating the tire pressure information with the tire temperature information. The frame transmitted from each transceiver 2 also contains the ID information. Therefore, the ID information transmitted during the periodical transmitting mode is compared with the ID information transmitted during the wheel identification process and stored in the memory of the control unit 32b so that the control unit 32b identifies the wheel on which the transceiver 2 that has transmitted the frame is mounted.

The obtained tire pressure is compared with the selected threshold value and the standard threshold value. When the obtained tire pressure is lower than the selected threshold value or the standard threshold value, the control unit 32b sends the warning signal to the display device 4. The warning signal is displayed in such a manner that the location of the tire in which the tire pressure decreases, is identified.

Next, initialization process of the selected threshold value will be described with reference to FIG. 3. The initialization process of the selected threshold value is performed by the control unit 32b of the receiver 3. Initialization process of the selected threshold value is performed simultaneously with the wheel identification process at predetermined time intervals. As shown in FIG. 3, the control unit 32b provides various functions according to step S11 to step S15. Specifically, step S11 and step S12 correspond to a determination unit that determines whether a tire pressure is increased, and is defined as a first determination unit. Step S13 corresponds to another determination unit that determines whether the tire temperature is increased, and is defined as a second determination unit.

In step S11, the control unit 32b determines whether the tire pressure of each of the tires is increased. Similar to the above-described tire pressure detection process, the control unit 32b obtains the tire pressure of each of the tires according to the tire pressure information and the tire temperature information, which are stored in the frame and transmitted from each transceiver 2 in the periodical transmitting mode. Then, the control unit 32b compares the current tire pressure with a previous tire pressure for each of the tires, and determines whether the tire pressure is increased. As described above, the control unit 32b does not determine whether the tire pressure is changed, but determines whether the tire pressure is increased in order to detect the increase in the tire pressure due to pressure adjustment without detecting a decrease in the tire pressure due to nature air leaking. Further, in step S11, the control unit 32b may also determine whether the detected time of the increase in the tire pressure for each of the tires fitted on the wheels 6a to 6d is different from one another. Usually, the pressure adjustment of the tires is performed at each tire. Thus, when the tire pressure of four tires increases at the same time, the increase in the tire pressure is not caused by the pressure adjustment.

When the tire pressure is increased, i.e., the determination in step S11 is "NO", the tire pressure is not adjusted. As shown in FIG. 3, the determination result of "NO" in step S11 means initialization process condition is not satisfied, thus, the initialization process ends and returns to "START". When the tire pressure is increased, i.e., the determination in step S11 is "YES", the initialization process proceeds to step S12.

In step S12, the control unit 32b determines whether the vehicle 1 is in the parking state. In step S12, the parking state of the vehicle 1 is detected according to the acceleration information, which is stored in the frame and is transmitted together with the tire pressure information by each transceiver 2. Specifically, while the vehicle 1 is in the parking state, an acceleration generated by the rotation of each of the wheels 6a to 6d is zero. Therefore, in step S12, the control unit 32b determines whether the vehicle 1 is in the parking state by determining whether the acceleration of each of the wheels 6a to 6d is zero. Usually, the pressure adjustment is performed in the parking state of the vehicle 1. Thus, the control unit 32b determines whether the vehicle 1 is in the parking state in order to avoid mistakenly identifying the increase in the tire pressure caused by the increase in the tire temperature as the increase in the tire pressure caused by the pressure adjustment. As shown in FIG. 3, when the vehicle 1 is in a moving state, i.e., the determination in step S12 is "NO", the initialization process ends and returns to "START". When the vehicle 1 is in the parking state, i.e., the determination in step S12 is "YES", the initialization process proceeds to step S13.

In step S12, the control unit 32b determines whether the vehicle 1 is in the parking state according to the acceleration information transmitted from each transceiver 2. Alternatively, the control unit 32b may determine whether the vehicle 1 is in the parking state according to the acceleration information transmitted from three transceivers 2 or less.

In step S13, the control unit 32b determines whether the tire temperature in each of the tires is increased. In step S13, the control unit 32b obtains the tire temperature in each of tires according to the tire temperature information, which is stored in the frame and transmitted from each transceiver 2 in the periodical transmitting mode. Then, the control unit 32b compares the current tire temperature with a previous tire temperature for each of the tires, and determines whether the tire temperature is increased. The control unit 32b determines whether the tire temperature is increased in order to avoid mistakenly identifying tire temperature increase caused by the outside temperature increase as the tire temperature increase caused by the pressure adjustment.

In order to avoid mistakenly identifying the tire temperature increase caused by the outside temperature as the tire temperature increase caused by the pressure adjustment, some people may think it is sufficient to only determine whether the tire temperature is increased in step S13 without determining whether the vehicle 1 is in the parking state in step S12. However, when the vehicle 1 starts to move, first the tire temperature increases, and then the tire pressure increases, accordingly the tire temperature detected by the sensing unit 21 of each transceiver 2 increases. As described above, the tire temperature detected by the transceiver 2 increases later than the tire temperature increase. Thus, step S12 is added before step S13.

In step S13, the control unit 32b determines whether the tire temperature of each of the tires is increased according to the tire temperature information transmitted from each transceiver 2. Alternatively, the control unit 32b may determine whether the tire temperature of each of the tires is increased according to the tire temperature information transmitted from three transceivers 2 or less.

Figure 3:
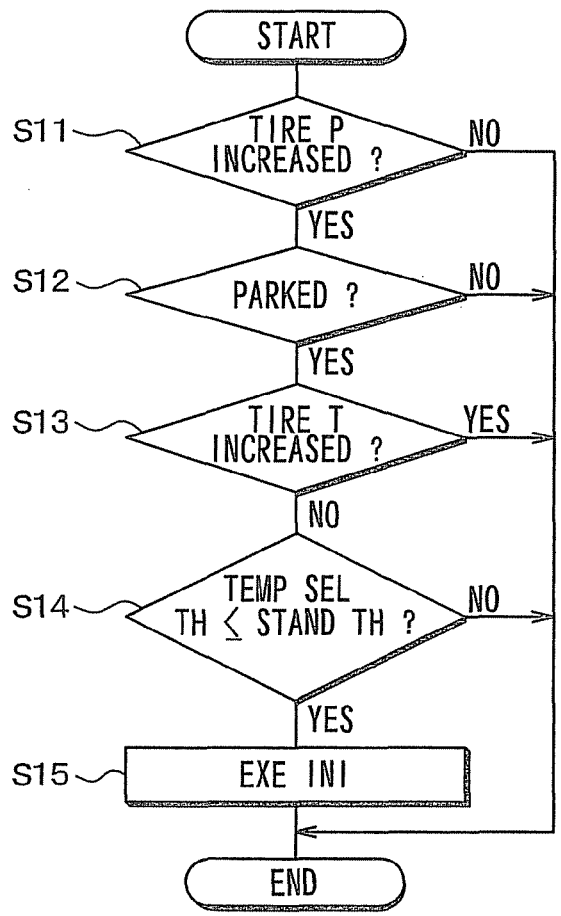
FIG. 3 is a flow chart showing an initialization process of a control unit of the receiver of the tire pressure monitoring apparatus shown in FIG. 1.

As shown in FIG. 3, when the tire temperature is increased, i.e., the determination in step S13 is "YES", the initialization process ends and returns to "START". When the tire temperature is not increased, i.e., the determination in step S13 is "NO", the initialization process proceeds to step S14.

In step S14, the control unit 32b determines whether a temporary selected threshold value is lower than the standard threshold value. Specifically, the control unit 32b calculates the temporary selected threshold value with a calculation method according to the obtained tire pressure. The calculation method performed in step S14 to obtain the temporary selected threshold value is similar to a calculation method performed in step S15 to obtain the selected threshold value, which is described later. Then the control unit 32b determines whether the temporary selected threshold value is lower than the standard threshold value. During a decrease of the tire pressure, the warning device (display device 4) is activated to warn the user when the obtained tire pressure is lower than the selected threshold value or the standard threshold value. Therefore, when the temporary selected threshold value is equal to or lower than the standard threshold value, there is no need to perform the initialization process of the selected threshold value.

As shown in FIG. 3, when the temporary selected threshold value is higher than the standard threshold value, i.e., the determination in step S14 is "NO", the initialization process ends and returns to "START". When the temporary selected threshold value is equal to or lower than the standard threshold value, i.e., the determination in step S14 is "YES", the process proceeds to step S15 and initializes the selected threshold value. Since the temporary selected threshold value is compared with the standard threshold value in step S14, impractical and profitless update of the selected threshold value is avoided, and the number of the storing of the selected threshold value to the memory is decreased.

In step S15, the selected threshold value is initialized. Specifically, the tire pressure obtained in step S11 is calculated to a pressure value that is decreased at a predetermined rate from the tire pressure, then the calculated pressure value is stored in the memory (not shown) of the control unit 32b as the selected threshold value.

As described above, the initialization process of the selected threshold value is performed.

At the end, when the ignition switch switches from the on state to the off state, the control unit 32b of the receiver 3 transmits the trigger command signal to the trigger device 5 again, and the trigger device transmits the trigger signal again to each transceiver 2. In each transceiver 2, when the trigger signal is received by the receiving antenna 25, and is transmitted to the control unit 22a of each transceiver 2 via the LF receiving unit 22c, each transceiver 2 turns to a sleep state. Accordingly, the wheel identification process, tire pressure detection process and initialization process of the selected threshold value end.

In the tire pressure monitoring apparatus according to the present embodiment, when the control unit 32b of the receive 3 determines that the tire pressure is increased during the vehicle 1 is parked as described in step S11 and step S12, the increase of the tire pressure is considered as an increase caused by the pressure adjustment. Thus, the control unit 32b of the receiver 3 initializes the selected threshold value.

Accordingly, when the tire pressure increases with the tire temperature increase caused by the movement of the vehicle 1, the control unit 32b avoids mistakenly determining the increase of the tire pressure as the increase of the tire pressure caused by the pressure adjustment. Additionally, the initialization of the selected threshold value is performed automatically after the pressure adjustment.

Thus, in the tire pressure monitoring apparatus according to the present embodiment, inconvenience of initialization for the user is resolved compared with a tire pressure monitoring apparatus that needs an operation for initialization, and an initialization switch and a wiring that couples the initialization switch to the receiver 3 are not required to be mounted on the vehicle.

Further, in the tire pressure monitoring apparatus according to the present embodiment, the control unit 32b of the receiver 3 performs the initialization process of the selected threshold value in a case where the increase of the tire pressure when the parking state is detected and no increase of the tire temperature as described in step S13 is detected. Thus, the control unit 32b avoids mistakenly determining the increase of the tire pressure caused by the increase of the outside temperature as the increase of the tire pressure caused by the pressure adjustment.

Furthermore, in the tire pressure monitoring apparatus according to the present embodiment, an alarm threshold value (a selected threshold value), which is required to be initialized in the following test procedure (3) and (10) for testing tire pressure monitoring system (TPMS) according to the United Nations Economic Communication (UNECE) Regulation No. 64, is initialized automatically. The test procedure for testing TPMS includes (1) inflating the tires to a recommended pressure, (2) turning the ignition switch on and confirming the bulb, (3) initializing, (4) driving the vehicle for 20 minutes, (5) measuring the tire pressure, (6) deflating the tires to a pressure reduced at a rate of 20% from the measured pressure in the (5), (7) driving the vehicle for 10 minutes (confirming the illuminating of the low pressure tell-tale light), (8) turning the ignition switch from on to off, and again turning the ignition switch (confirming continuation of the illuminated state of the low pressure tell-tale light for a predetermined time), (9) inflating the tires to the recommended pressure and (10) initializing (confirming switch-off of the low pressure tell-tale light).

(Second Embodiment)

In a tire pressure monitoring apparatus according to a second embodiment of the present disclosure, the control unit 22a of each transceiver 2 determines to perform the initialization process. It is different from the tire pressure monitoring apparatus according to the first embodiment, in which execution of the initialization process is determined by the control unit 32b of the receiver 3.

Figure 4:
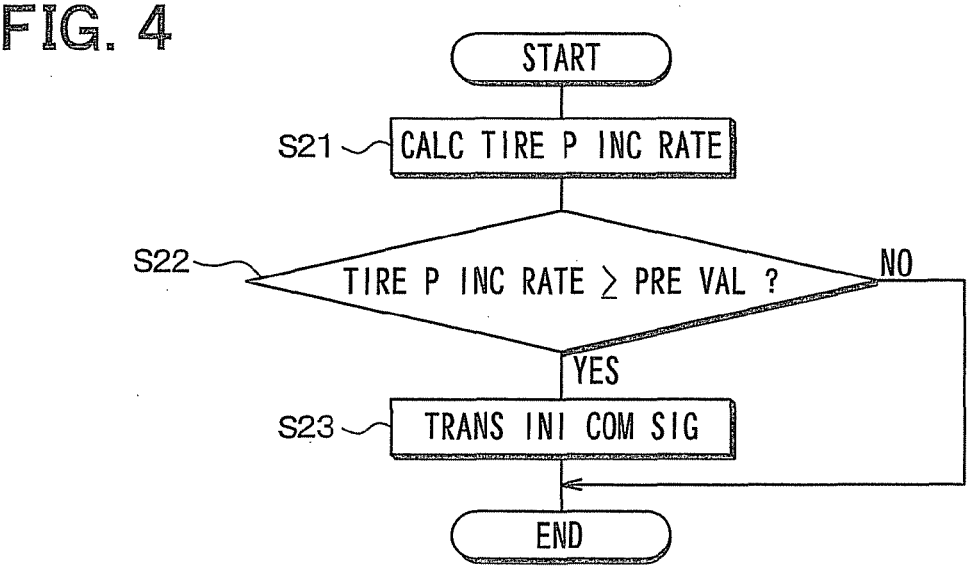
FIG. 4 is a flow chart showing a determination process of a control unit of a transceiver of a tire pressure monitoring apparatus according to a second embodiment.

As shown in FIG. 4, determining of the initialization process is performed at predetermined time intervals while the control unit 22a of each transceiver 2 is in the wake-up state. The control unit 22a of each transceiver 2 provides various functions according to step S21 to step S23. Specifically, step S21 is defined as a calculation unit that calculates a tire pressure increase rate based on a previous tire pressure and a current tire pressure, and step S22 functions as a determination unit that determines whether the tire pressure increase rate is equal to or higher than a predetermined rate value, and is defined as a determination unit.

In step S21, the control unit 22a of each transceiver 2 calculates the tire pressure increase rate based on the previous tire pressure and the current tire pressure. Before calculating the tire pressure increase rate, the control unit 22a of each transceiver 2 calculates the tire pressure according to the tire pressure detection signal and the tire temperature detection signal detected by the sensing unit 21. The tire pressure is calculated in a similar calculation method with the calculation method performed by the control unit 32b of the receiver 3. Then the tire pressure increase rate is calculated based on the previous tire pressure stored in the memory of the control unit 22a, the current tire pressure and the predetermined time interval of the frame transmitting by the transceivers 2.

In step S22, the control unit 22a of each transceiver 2 determines whether the tire pressure increase rate is equal to or higher than a predetermined rate value. In step S22, whether the tire pressure is increased is determined together with the comparison of tire pressure increase rate with the predetermined rate value. The predetermined rate value is preliminarily stored in the memory of the control unit 22a of each transceiver 2. The predetermined rate value is set to a higher value than a tire pressure increase rate caused by the increase of the outside temperature, and increase of the tire temperature caused by the movement of the vehicle. For example, the predetermined rate value may be set to 20 kPa/ 15 s. Accordingly, when the calculated tire pressure increase rate is equal to or higher than the predetermined rate value, it is known that the increase of the tire pressure is caused by the pressure adjustment, but not caused by the increase of the outside temperature or the increase of the tire temperature caused by the movement of the vehicle.

As shown in FIG. 4, when the tire pressure increase rate is lower than the predetermined rate value, i.e., the determination in step S22 is "NO", the process ends and returns to "START". When the tire pressure increase rate is equal to or higher than the predetermined rate value, i.e., the determination in step S22 is "YES", the process proceeds to step S23.

In step S23, the control unit 22a of each transceiver 2 transmits an initialization command signal to the receiver 3 via the RF transmitting unit 22b and the transmitting antenna 24. For example, an initialization status bit prepared by changing a predetermined bit or an initialization message may be transmitted as the initialization command signal for a predetermined period of time. The initialization command signal may be transmitted with other information, such as the tire pressure information, the tire temperature information and the acceleration information, in the same frame. The initialization command signal may also be transmitted in another frame.

When the receiver 3 receives the initialization command signal, the receiver 3 initializes the selected threshold value similar to step S15 shown in FIG. 3. Additionally, step S14 shown in FIG. 3 may also be performed before initialization of the selected threshold value.

As described above, in the tire pressure monitoring apparatus according to the present embodiment, when the control unit 22a of each transceiver 2 determines that the tire pressure increase rate is equal to or higher than the predetermined rate value as described in step S22, the increase of the tire pressure is considered as an increase caused by the pressure adjustment. Thus, the control unit 32b of the receiver 3 performs the initialization of the selected threshold value.

(Other Embodiments)

In the first embodiment, the control unit 32b of the receiver 3 determines conditions for performing step S11 to step S13. Alternatively, another control unit (for example, a hard ware device) other than the control unit 32b may determine the conditions for performing step S11 to step S13. Alternatively, the control unit 22a may also determine the conditions for performing step S11 to step S13. In a case where the control unit 22a of each transceiver 2 determines the conditions for performing step S11 to step S13, the control unit 22a of each transceiver 2 calculates the tire pressure according to the tire pressure detection signal and the tire temperature detection signal detected by the sensing unit 21. Further, the control unit 22a of each transceiver 2 may calculate a vehicle velocity according to the acceleration signal detected by the sensing unit 21.

In the first embodiment, the parking state of the vehicle is determined by an angular velocity detected by the sensing unit 21. Alternatively, the control unit 32b of the receiver 3 may also determine the parking state of the vehicle by retrieving the vehicle velocity detected by a velocity sensor via an in-vehicle local area network (LAN). Alternatively, the control unit 32b of the receiver 3 may also determine the parking state of the vehicle by retrieving a gear position detected by a gear position sensor via the in-vehicle local area network (LAN). When the vehicle velocity is zero or the gear position is set in parking range, the vehicle is in the parking state.

In the second embodiment, the control unit 22a of each transceiver 2 determines initialization conditions for performing step S22. Alternatively, another control unit (for example, a hard ware device) other than the control unit 22a may determine the initialization conditions for performing step S22. Alternatively, the control unit 32b of the receiver 3 may also determine the initialization conditions for performing step S22.

The above disclosure has the following aspects.

According to an aspect of the present disclosure, a tire pressure monitoring apparatus includes a plurality of transceivers, a receiver and a warning device. Each transceiver is mounted on a respective wheel having a tire in a vehicle. The receiver is mounted on a body of the vehicle. The warning device receives a warning signal transmitted from the receiver. Each transceiver includes a sensing unit, a first control unit and a transmitting unit. The sensing unit outputs the tire pressure signal, the first control unit processes the tire pressure signal outputted by the sensing unit to a processed tire pressure signal, and the transmitting unit transmits the processed tire pressure signal to the receiver. The receiver includes a receiving unit and a second control unit. The receiving unit receives the processed tire pressure signal, the second control unit calculates a tire pressure according to the processed tire pressure signal and activates the warning device when the tire pressure is lower than an alarm threshold value. The second control unit sets a selected threshold value as the alarm threshold value, and the selected threshold value is initially set by a user. Each transceiver or the receiver includes a determination unit, which determines whether the tire pressure increases while the vehicle is parked. When the determination unit determines that a current tire pressure is increased compared with a previous tire pressure while the vehicle is parked, the second control unit calculates the selected threshold value according to the current tire pressure, and stores the selected threshold value.

In the above apparatus, the determination unit determines that the current tire pressure is increased compared with the previous tire pressure while the vehicle is parked. Thus, the increase of the tire pressure caused by the movement of the vehicle is avoided being determined mistakenly as the increase of the tire pressure caused by the pressure adjustment. Additionally, the initialization of the selected threshold value is performed automatically after the pressure adjustment. Thus, in the above apparatus inconvenience of initialization for the user is resolved compared with a tire pressure monitoring apparatus that needs an operation for initialization, and an initialization switch and a wiring that couples the initialization switch to the receiver are not required to be mounted on the vehicle.

Alternatively, when the determination unit for determining whether the tire pressure increases while the vehicle is parked is defined as a first determination unit, each transceiver or the receiver may further include a second determination unit, which determines whether a tire temperature increases. When the second determination unit determines that the tire temperature does not increase, the second control unit calculates the selected threshold value according to the current tire pressure, and stores the selected threshold value. In this case, the increase of the tire pressure caused by the increase of the outside temperature is avoided being determined mistakenly as the increase of the tire pressure caused by the pressure adjustment.

Alternatively, the second control unit may use both of the selected threshold value and a standard threshold value as the alarm threshold value, the standard threshold being set and preliminarily stored as a fixed value. The second control unit activates the warning device when the tire pressure is lower than at least one of the selected threshold value and the standard threshold value. The second control unit does not store the selected threshold value when the selected threshold value calculated by the second control unit is higher than the standard threshold value. Since the warning device is activated when the tire pressure is lower than the standard threshold value, storing the selected threshold value lower than the standard threshold value is impractical and profitless. In this case, impractical and profitless update of the selected threshold value is avoided.

According to another aspect of the present disclosure, a tire pressure monitoring apparatus includes a plurality of transceivers, a receiver and a warning device. Each transceiver is mounted on a respective wheel having a tire in a vehicle. The receiver is mounted on a body of the vehicle. The warning device receives a warning signal transmitted from the receiver. Each transceiver includes a sensing unit, a first control unit and a transmitting unit. The sensing unit outputs the tire pressure signal, the first control unit processes the tire pressure signal outputted by the sensing unit to a processed tire pressure signal, and the transmitting unit transmits the processed tire pressure signal to the receiver. The receiver includes a receiving unit and a second control unit. The receiving unit receives the processed tire pressure signal, the second control unit calculates a tire pressure according to the processed tire pressure signal and activates the warning device when the tire pressure is lower than an alarm threshold value. The second control unit sets a selected threshold value as the alarm threshold value, and the selected threshold value is initially set by a user. Each transceiver or the receiver includes a calculation unit and a determination unit, the calculation unit calculates a tire pressure increase rate based on a previous tire pressure and a current tire pressure, and the determination unit determines whether the tire pressure increases rate is equal to or higher than a predetermined rate value. When the determination unit determines that the tire pressure increase rate is equal to or higher than the predetermined rate value, the second control unit calculates the selected threshold value according to the current tire pressure, and stores the selected threshold value.

In the above apparatus, the predetermined rate value is set to a higher value than a tire pressure increase rate caused by the increase of the outside temperature, and increase of the tire temperature caused by the movement of the vehicle. In this case, the increase of the tire pressure caused by the movement of the vehicle is avoided being determined mistakenly as the increase of the tire pressure caused by the pressure adjustment. Further the increase of the tire pressure caused by the increase of the outside temperature is avoided being determined mistakenly as the increase of the tire pressure caused by the pressure adjustment. Additionally, the initialization of the selected threshold value is performed automatically after the pressure adjustment. Thus, inconvenience of initialization for the user is resolved compared with a tire pressure monitoring apparatus that needs an operation for initialization, and an initialization switch and a wiring that couples the initialization switch to the receiver are not required to be mounted on the vehicle.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A tire pressure monitoring apparatus comprising:
    a plurality of transceivers, each of which is mounted on a respective wheel having a tire in a vehicle;
    a receiver mounted on a body of the vehicle; and
    a warning device receiving a warning signal transmitted from the receiver,
    wherein each transceiver includes a sensing unit, a first control unit and a transmitting unit,
    wherein the sensing unit outputs the tire pressure signal, the first control unit processes the tire pressure signal outputted by the sensing unit to a processed tire pressure signal, and the transmitting unit transmits the processed tire pressure signal to the receiver,
    wherein the receiver includes a receiving unit and a second control unit,
    wherein the receiving unit receives the processed tire pressure signal,
    wherein the second control unit calculates a tire pressure according to the processed tire pressure signal and activates the warning device when the tire pressure is lower than an alarm threshold value,
    wherein the second control unit sets a selected threshold value as the alarm threshold value, and the selected threshold value is initially set by a user,
    wherein each transceiver or the receiver includes a determination unit, which determines whether the tire pressure increases while the vehicle is parked, and
    wherein when the determination unit determines that a current tire pressure is increased compared with a previous tire pressure while the vehicle is parked, the second control unit calculates the selected threshold value according to the current tire pressure, and stores the selected threshold value.

2. The tire pressure monitoring apparatus according to claim 1,
    wherein the determination unit for determining whether the tire pressure increases while the vehicle is parked, is defined as a first determination unit,
    wherein each transceiver or the receiver further includes a second determination unit, which determines whether a tire temperature increases, and
    wherein when the second determination unit determines that the tire temperature does not increase, the second control unit calculates the selected threshold value according to the current tire pressure, and stores the selected threshold value.

3. The tire pressure monitoring apparatus according to claim 1:
    wherein the second control unit uses both of the selected threshold value and a standard threshold value as the alarm threshold value, the standard threshold value being set and preliminarily stored as a fixed value,
    wherein the second control unit activates the warning device when the tire pressure is lower than at least one of the selected threshold value and the standard threshold value, and wherein the second control unit does not store the selected threshold value when the selected threshold value calculated by the second control unit is higher than the standard threshold value.

4. A tire pressure monitoring apparatus comprising:
a plurality of transceivers, each of which is mounted on a respective wheel having a tire in a vehicle;
a receiver mounted on a body of the vehicle; and
a warning device receiving a warning signal transmitted from the receiver,
wherein each transceiver includes a sensing unit, a first control unit and a transmitting unit,
wherein the sensing unit outputs the tire pressure signal, the first control unit processes the tire pressure signal outputted by the sensing unit to a processed tire pressure signal, and the transmitting unit transmits the processed tire pressure signal to the receiver,
wherein the receiver includes a receiving unit and a second control unit,
wherein the receiving unit receives the processed tire pressure signal,
wherein the second control unit calculates a tire pressure according to the processed tire pressure signal and activates the warning device when the tire pressure is lower than an alarm threshold value,
wherein the second control unit sets a selected threshold value as the alarm threshold value, and the selected threshold value is initially set by a user,
wherein each transceiver or the receiver includes a calculation unit and a determination unit, the calculation unit calculates a tire pressure increase rate based on a previous tire pressure and a current tire pressure, and the determination unit determines whether the tire pressure increases rate is equal to or higher than a predetermined rate value, and
wherein when the determination unit determines that the tire pressure increase rate is equal to or higher than the predetermined rate value, the second control unit calculates the selected threshold value according to the current tire pressure, and stores the selected threshold value.

* * * * *